(12) United States Patent
Lodge et al.

(10) Patent No.: US 9,073,097 B2
(45) Date of Patent: Jul. 7, 2015

(54) RETRACTABLE CLEANING CLOTH FOR MOBILE DEVICES

(71) Applicants: Jennifer L. Lodge, Williamsburg, MI (US); Thomas N. Lodge, Williamsburg, MI (US)

(72) Inventors: Jennifer L. Lodge, Williamsburg, MI (US); Thomas N. Lodge, Williamsburg, MI (US)

(73) Assignee: Lodge Idea, LLC, Williamsburg, MI (US)

( * ) Notice: Subject to any disclaimer, the term of this patent is extended or adjusted under 35 U.S.C. 154(b) by 0 days.

(21) Appl. No.: 13/902,803

(22) Filed: May 25, 2013

(65) Prior Publication Data

US 2014/0137348 A1    May 22, 2014

Related U.S. Application Data

(60) Provisional application No. 61/728,925, filed on Nov. 21, 2012.

(51) Int. Cl.
| | | |
|---|---|---|
| *A45C 15/00* | (2006.01) | |
| *B08B 1/00* | (2006.01) | |
| *A47L 25/00* | (2006.01) | |
| *G06F 3/02* | (2006.01) | |
| *A45C 11/00* | (2006.01) | |

(52) U.S. Cl.
CPC ........... *B08B 1/006* (2013.01); *A45C 2011/002* (2013.01); *A47L 25/00* (2013.01); *G06F 3/0202* (2013.01)

(58) Field of Classification Search
CPC ... H04M 1/0214; H04M 1/23; H04M 1/3833; H04M 1/0247; H04M 1/0237; A45C 15/00; A45C 2011/002
USPC ............. 455/550.1, 575.1, 575.4, 575.8; 379/428.01, 433.01, 447, 452, 451, 379/433.11, 433.12, 437, 440; 206/320, 38; 15/208, 209.1, 105, 118; 361/679.01
See application file for complete search history.

(56) References Cited

U.S. PATENT DOCUMENTS

| | | | |
|---|---|---|---|
| 6,003,663 A | 12/1999 | Newcomer | |
| 6,195,831 B1 | 3/2001 | Devaney et al. | |
| 6,881,273 B1* | 4/2005 | Oberman | 134/6 |
| 7,801,576 B2 | 9/2010 | Fagrenius et al. | |
| 8,579,172 B2* | 11/2013 | Monaco et al. | 224/666 |
| 2003/0121114 A1 | 7/2003 | Waite | |
| 2005/0255898 A1* | 11/2005 | Huang | 455/575.8 |
| 2006/0043727 A1 | 3/2006 | Brown | |

(Continued)

FOREIGN PATENT DOCUMENTS

| | | |
|---|---|---|
| JP | 3098388 U | 9/2003 |
| KR | 2005-0036598 | 4/2005 |

*Primary Examiner* — Steven A. Reynolds
*Assistant Examiner* — Javier A Pagan
(74) *Attorney, Agent, or Firm* — Northern Michigan Patent Law, PLC

(57) ABSTRACT

A cleaning case for a portable electronic device such as a mobile phone or tablet computer. The case is adapted to be secured to or receive a lower side or face of the electronic device, and includes a housing with a wipe storage compartment for a reusable screen wipe. The wipe can be pulled from the storage compartment in a flat sheet configuration through a slot in the housing, up and around the housing and device mounted thereon, in order to clean the screen of the device. The housing further includes a retraction means for retracting the wipe back into the storage compartment after use. The case may also be formed integrally with the electronic device.

22 Claims, 9 Drawing Sheets

(56) References Cited

U.S. PATENT DOCUMENTS

| | | | |
|---|---|---|---|
| 2009/0194444 A1* | 8/2009 | Jones | 206/320 |
| 2010/0017982 A1 | 1/2010 | Pohkamp | |
| 2010/0182738 A1 | 7/2010 | Visser et al. | |
| 2011/0186076 A1* | 8/2011 | Appleton | 134/6 |
| 2011/0284025 A1 | 11/2011 | Lemchen | |
| 2012/0192372 A1 | 8/2012 | Smith | |

\* cited by examiner

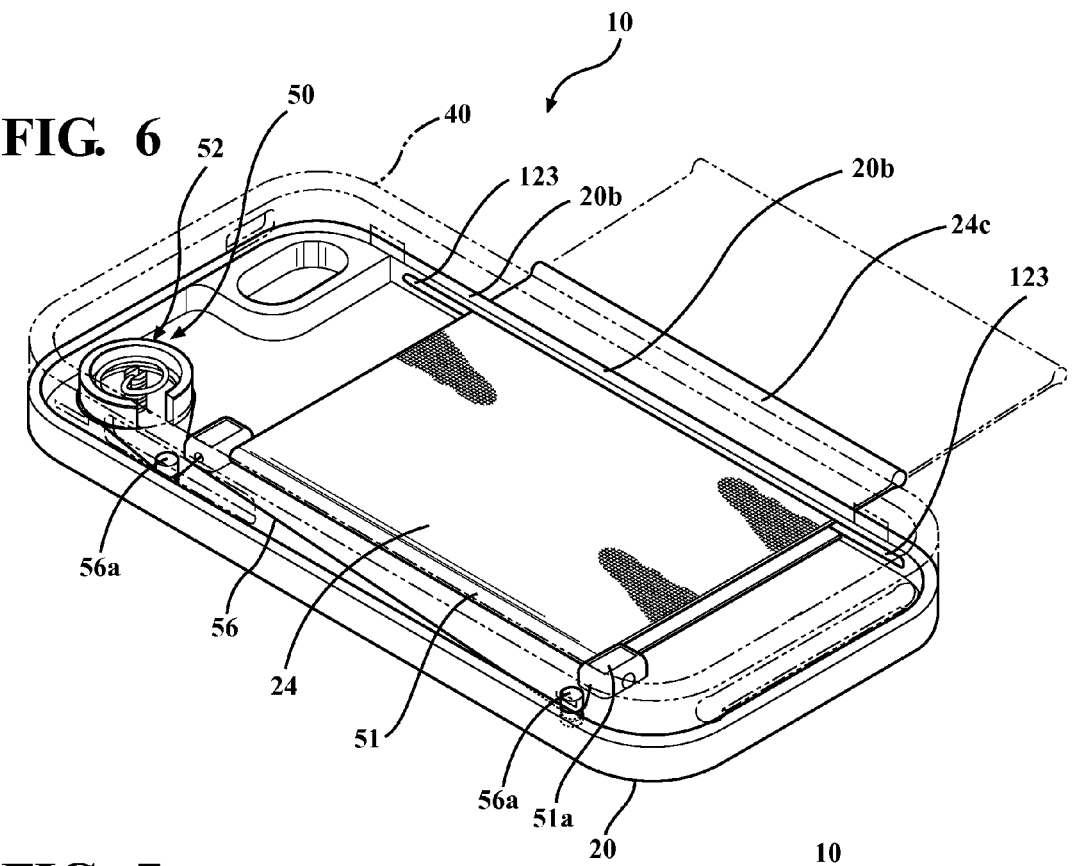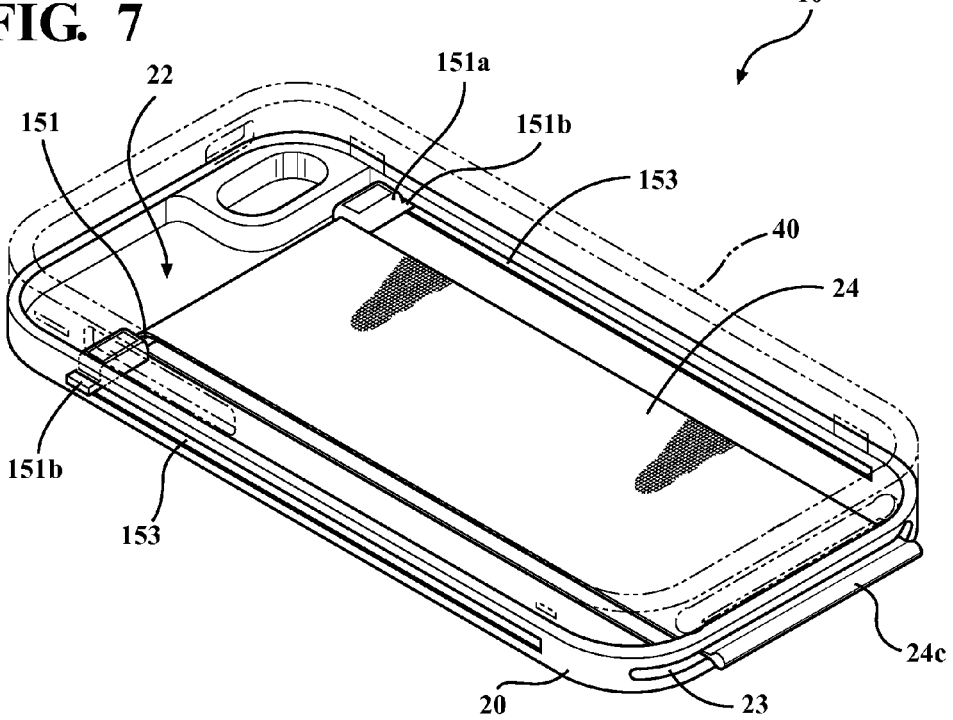

RETRACTABLE CLEANING CLOTH FOR MOBILE DEVICES

RELATED APPLICATIONS/PRIORITY BENEFIT CLAIM

This application claims the benefit of U.S. Provisional Application No. 61/728,925, filed Nov. 21, 2012 by a common inventor (Jennifer Lodge), the entirety of which provisional application is hereby incorporated by reference.

FIELD

The subject matter of the present application is in the field of portable cleaning cloths for mobile electronic devices with screens.

BACKGROUND

It is known to provide carrying or protective cases for devices with viewing surfaces, such as eyeglasses or portable electronics with display or viewing screens, whose viewing surfaces need to be regularly cleaned with a cleaning cloth. It is also known to provide cases for such devices that contain a wiping device or a cleaning cloth, or that include a cavity for carrying a wiping device or cleaning cloth.

Examples of cleaning cloth cases or other cleaning devices include U.S. Pat. No. 6,003,663 to Newcomer (eyeglass case that includes one or more internal receptacles for storing miscellaneous accessory items, including a lens wiping cloth); U.S. Application No. 2012/0192372 to Smith (touchscreen smudge eraser in a separate carrying case with protective cap and reversible blade); U.S. Application No. 2011/0284025 to Lemchen (electronic device case with built-in screen cleaner bar, the bar riding in a track over the device's display screen, the bar optionally motor-driven and and automatically activated); U.S. Application No. 2011/0186076 to Appleton (electronic device case with a folding cover storing a wipe in an open-faced pocket such that, when the cover is closed, the wipe is placed into direct, static contact with skin-contacting surfaces of the electronic device); U.S. Application No. 2003/0121114 to Waite (dusting cloth removably attached to outside of desktop monitor casing with a reel-retracted tether); and U.S. Pat. No. 7,801,576 to Fagrenius et al (elongated cleaning bar positioned over the screen of a flip- or slide-style phone, the bar automatically activated to wipe the screen when the screen portion of the phone is opened or closed).

Soft fabric-type wipes are in our opinion the best cleaning tools for display/viewing screens (hereafter "screen") on mobile phones, tablet computers, and similar devices. None of the foregoing attempts to provide cleaning tools for phone screens, eyeglasses, or computer monitors is, in our opinion, suitably convenient, practical, and effective.

BRIEF SUMMARY

We have invented a cleaning case for a portable electronic screen device such as (but not limited to) a mobile phone or tablet computer. The cleaning case includes built-in cleaning means that are convenient, practical, and effective for cleaning the screen of a device integrated with or mounted to the case.

Our cleaning case is a portable case including an electronic screen face at an upper side of the case, either having an integrated screen or for holding or attaching to a portable device with a screen. The screen face may be a device-mounting face configured to secure a screen device with at least some of the screen visible and exposed for cleaning, for example with a flat area sized to receive the back of the device, and means for removably securing the device to the face. The case further includes a reusable screen wipe stored in a wipe compartment situated below the screen face or device-mounting location, and a wipe-retracting apparatus operatively connected to the wipe.

In a further form, the screen wipe has an inner end connected to the wipe-retracting apparatus, and an outer free end positioned in a substantially flat sheet configuration at a wipe access slot on a side of the case. The outer end of the wipe is manually accessible from outside the case, and the wipe is long enough to be pulled out of the wipe compartment from the side of the case to an extended cleaning position over the screen of a device secured to the device-mounting face.

The wipe-retracting apparatus is operable to withdraw the wipe back into the storage compartment in the case. In a preferred form, the retracting apparatus retracts the wipe automatically, for example under spring or elastic tension. In a currently preferred form, the retracting apparatus is a spring-tensioned reel. In an alternate form the retracting apparatus is a non-tensioned slider, the slider having an operating tab accessible from the outside of the case to pull the wipe back into the storage compartment. The retracting apparatus may also be, without limitation, an elastic member, or a motor activated to retract the wipe back into the storage compartment, and may include a latch mechanism to temporarily hold the wipe in an extended cleaning position.

The means for securing the device to the mounting location may be a frame secured to the case over the edges of the device, the frame optionally removable and substantially surrounding the sides of the device. Alternately, or additionally, the upper face could include a continuous locking member or a number of discontinuous locking members, for example snap tabs, that removably secure the edges of the device to the case. Other means for securing the screen device to the case are possible, including but not limited to alternate mechanical connections, mating hook-and-loop surfaces, a stretchable material or frame, or removable adhesive.

The wipe is preferably relatively wide and flat when deployed, and stored in a substantially flat, sheet-like configuration in an interior compartment under the electronic device-mounting location, with a width substantially corresponding to the width of the display screen of a device mounted on the upper side of the case. Extending the wipe out of its storage compartment up and around the side of the case and over the device-mounting location puts the wipe in a substantially aligned, mating relationship with the screen of a mounted device. Less preferable, but also possible, are narrow and/or non-flat wipe structures such as ribbon- or cord-like wipe configurations.

The wipe may be any reusable, soft, non-scratching material useful for cleaning electronic screens, and although it may be referred to as a "fabric" wipe herein for convenience, it may be a nonwoven material and may be natural or synthetic. The wipe may be treated with a screen-cleaning or screen-protecting substance, or it may be untreated. The wipe may be permanently attached to the case, or the wipe may be replaceably connected to the case.

These and other features and advantages of the invention will become apparent from the detailed description below, in light of the accompanying drawings.

BRIEF DESCRIPTION OF THE DRAWINGS

FIGS. 4 and 4A are similar to FIG. 3, but show the wipe fully extended from the side of the case, with FIG. 4A showing a detail of a replaceable wipe structure.

FIG. 6 is a perspective view of a case similar to that in FIGS. 1-5, but with the wipe and wipe-retracting apparatus re-oriented to operate through a different side of the case.

FIG. 7 is a perspective view of a case with an alternate, manual retraction mechanism for the wipe.

DETAILED DESCRIPTION

Figure 1:
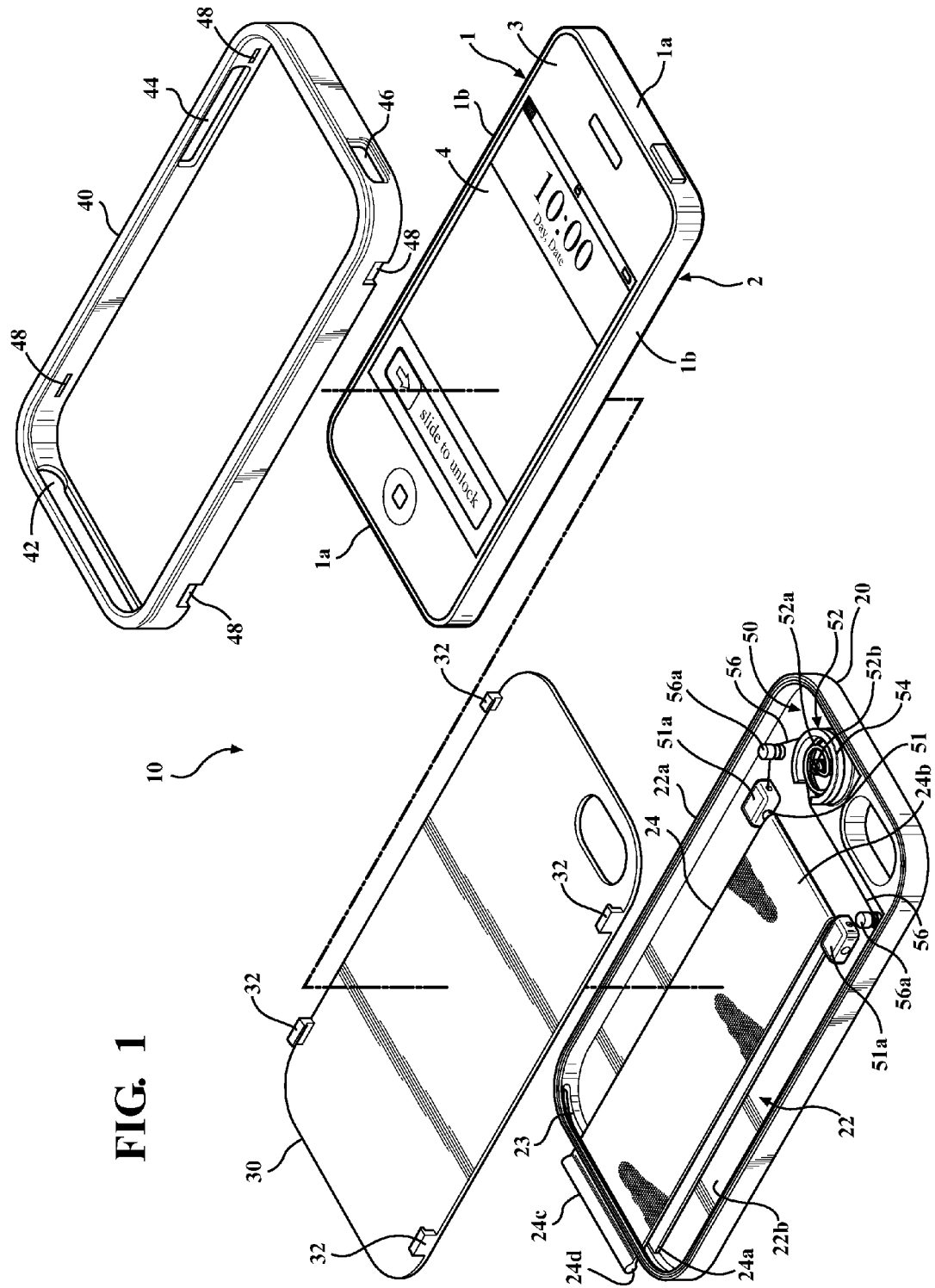
FIG. 1 is an exploded perspective view of an example cleaning case according to the invention, also showing an electronic screen device exploded relative to an upper device-mounting location.

Referring first to FIG. 1, a cleaning case 10 for a portable screen device 1 is shown in exemplary form in order to teach how to make and use the claimed invention. The invention herein disclosed includes a reusable fabric wipe composed of material/cloth (hereafter referred to as a "wipe") which is positioned in a provided cavity or compartment in case 10 for a mobile phone/smartphone/tablet computer or any other portable electronic or digital device (hereafter "device") which has a display screen or screens or similar viewing surface(s). A retracting apparatus is attached to and constructed within the case 10, and is attached to the wipe stored in the case. In the illustrated example, the retracting apparatus is attached to an inner end of the wipe, and the outer end of the wipe includes a bar or other mechanism or structure that does not allow the wipe to be fully retracted into the case, thus leaving a means to grip the wipe and extract it from the case for cleaning the viewing screen of the device attached to the case. When the wipe is fully extended, the user may wipe and clean the face and screen of the device.

The retracting apparatus may have one or more coil-type extensions, or tension springs, which provide the function of allowing the wipe to be pulled, under tension, from the case for the cleaning operation, and then, upon release, to be retracted back into the case. The retracting coil or spring and the shape of the cavity and the opening or slot through which the wipe is extracted or extended from the case allow the wipe to be self-oriented when it is retracted back into the case.

Different widths and thicknesses of wipe may be provided. The retracting means may be of increased or decreased strength depending on the width and thickness of the wipe and accompanying need for increased or decreased force required to extract the wipe from the case into the wiping position, or to retract the wipe back into the case upon completion of the cleaning motion.

The case containing the wipe and retracting apparatus may be designed to allow for all technical features of the device to be accessed, as are prior cases, if the case is designed to receive or mount a separate screen device. In other words, the device will be configured or mounted in the case so as not to detract from other features of the device such as volume controls, recharging ports, cameras, and other features. If the case is integral with the screen device, i.e. if the wipe and retracting apparatus are built into a compartment or cavity in the screen device's original case or housing, such device features will already be accommodated.

Illustrated case 10 includes a lower housing 20 with a wipe storage compartment 22 containing a wipe 24; a mounting face or cover 30 sized to receive the back face of a device 1; and, a device-securing means such as 40 associated with mounting face 30. While case 10 is illustrated for use with a smartphone-type device 1, it will be understood that the size and shape may vary for different sizes, makes, models, and types of portable device. In the illustrated example, case 10 is predominantly made from a molded polymer material, although it would be possible to use other materials such as metal or wood, without limitation.

Case 10 also includes a wipe retracting means 50, preferably contained in the wipe compartment 22 as illustrated, or contained in an adjacent or communicating compartment in the lower housing 20.

As shown in the exploded view of FIG. 1, and in the subsequent Figures, lower housing 20 is configured to be secured to the back face 2 of device 1, opposite the display or viewing screen 4 on the upper face 3 of the device. Lower housing 20 is preferably sized to approximate or match the dimensions of the back face 2 of device 1, to form an unobtrusive extension of the device in order to maintain the device's convenience, aesthetics, and portability. "Secured to" the back face 2 of device 1 should be understood to include not only actual contact between some portion of lower housing 20 and the back side 2 of device 1, but also mounting arrangements where the housing 20 receives or mates with some portion of the device without obscuring the screen for cleaning, and where the back or bottom side of the device opposite the screen is generally facing, against, or adjacent housing 20 when the two are united.

In the illustrated example, lower housing 20 is secured to device 1 via mounting face 30, which may be integrated with housing 20 (for example permanently attached or molded), or which may be separable from the housing (for example with screws or a snap-fit). In the illustrated example, mounting face 30 is a removable, substantially flat plate or cover that substantially or completely closes wipe compartment 22. It would also be possible for mounting face 30 to be an inwardly-extending shelf, or a series of supports formed or mounted around the upper edge or periphery 22a of the wipe compartment 22, rather than a full plate or cover; in such case, the lower housing 20 may be attached directly to the back face of device 1, with the device itself closing off or covering the wipe compartment 22, and the upper opening of compartment 22 and the upper edge of housing 20 forming the mounting "face". If mounting face 30 is permanently attached to lower housing 20, it may be desirable to make a lower face of the housing 20 removable for cleaning, replacing, or repairing the wipe and/or retracting mechanism.

The device-securing means on case 10 may be a separate piece adapted to mate with mounting face 30 and/or lower housing 20, such as the removable device-shaped frame 40 shown in FIG. 1, or it may be one or more structures integrated with mounting face 30 and/or lower housing 20, such as (but not limited to) the snap tabs 32 formed on mounting face 30, or a frame or lip 40 made of a rubber-like elastomer adapted to receive the screen device with a stretch fit and to secure the housing 20 to the device. In the illustrated example of FIG. 1, tabs 32 are configured to mate with and secure frame 40 over the device, but tabs 32 could also be configured to mate directly with and secure the device 1 to the mounting face 30. Device 1 has been omitted from the drawings of the assembled case in FIGS. 2-4, in order to provide a better view of the operation of wipe 24 and retracting means 50. FIG. 5, however, shows device 1 mounted to case 10 using the frame 40.

Frame 40 is a currently preferred means of securing device 1 to the case, and in the illustrated example is a substantially continuous frame surrounding the side edges 1a, 1b and a peripheral portion of the upper face 3 of device 1 to hold it in place on lower housing 20/mounting face 30. Frame 40 includes various openings 42, 44, 46, etc. to provide access to charging or USB ports, phone controls, and other features that will be apparent to those skilled in the art. Frame 40 is locked to mounting face 30 by mating engagement between receptacles 48 on the sides of the frame and locking tabs or fingers 32 on faceplate 30. As noted above, frame 40 may be integrated with housing 20 and/or faceplate 30.

Locking tabs 32 or similar features on faceplate 30 may alternately be configured to engage device 1 directly in a locking fit, to directly secure device 1 to the housing 20 without the use of a separate frame or other structure such as 40.

Locking tabs 32 or similar features may be formed directly on housing 20 to mount the housing 20 directly to the back of device 1, with the back of the device 1 covering compartment 22.

It may also be possible to form housing 20 integrally with the housing or casing of device 1, so that device 1 includes its own permanent wipe storage compartment and internal retracting means. FIG. 5 may accordingly be considered to schematically represent an embodiment in which housing 20, mounting face 30, and frame 40 are integral parts of the screen device's original case or housing, with a wipe compartment, wipe, and retraction mechanism and associated structures formed in the case upon manufacture of the device in operative association with the screen.

Figure 2:
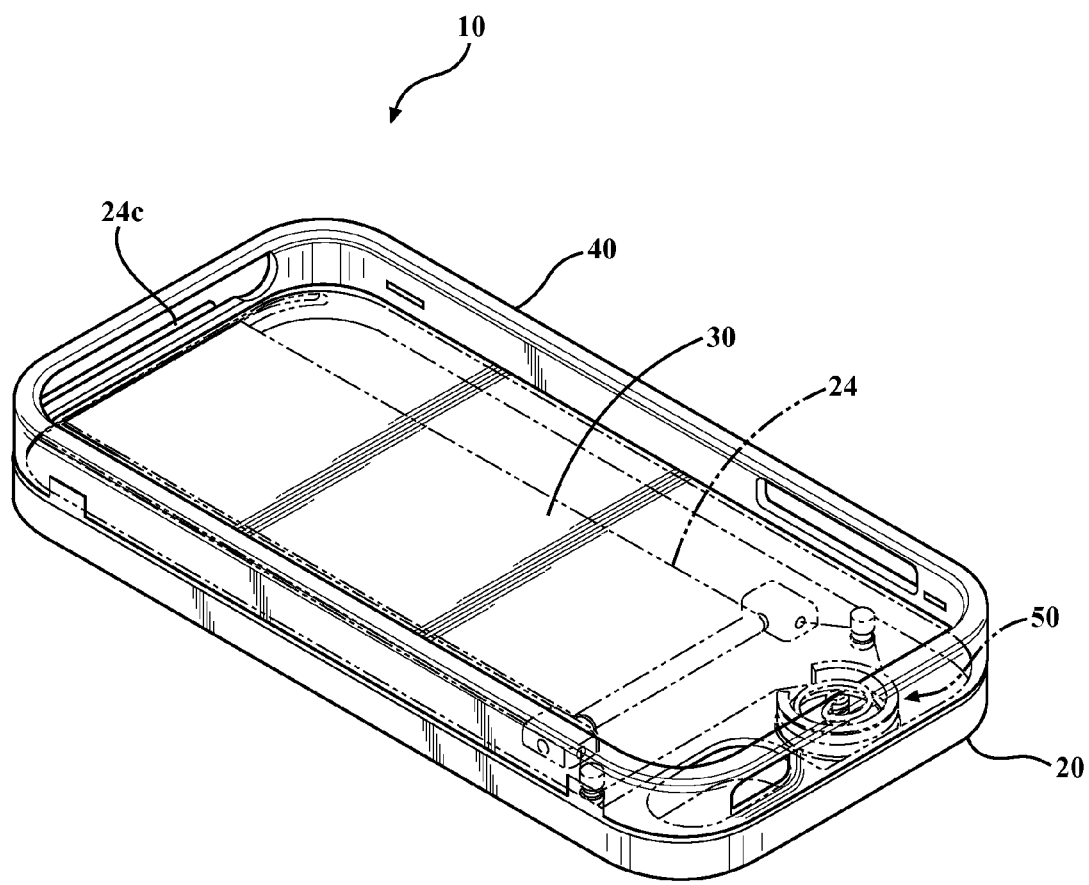
FIG. 2 shows the case of FIG. 1 with the cleaning case assembled, and with a screen wipe and retraction mechanism shown in hidden lines in a compartment underneath the device-mounting location.
Figure 3:
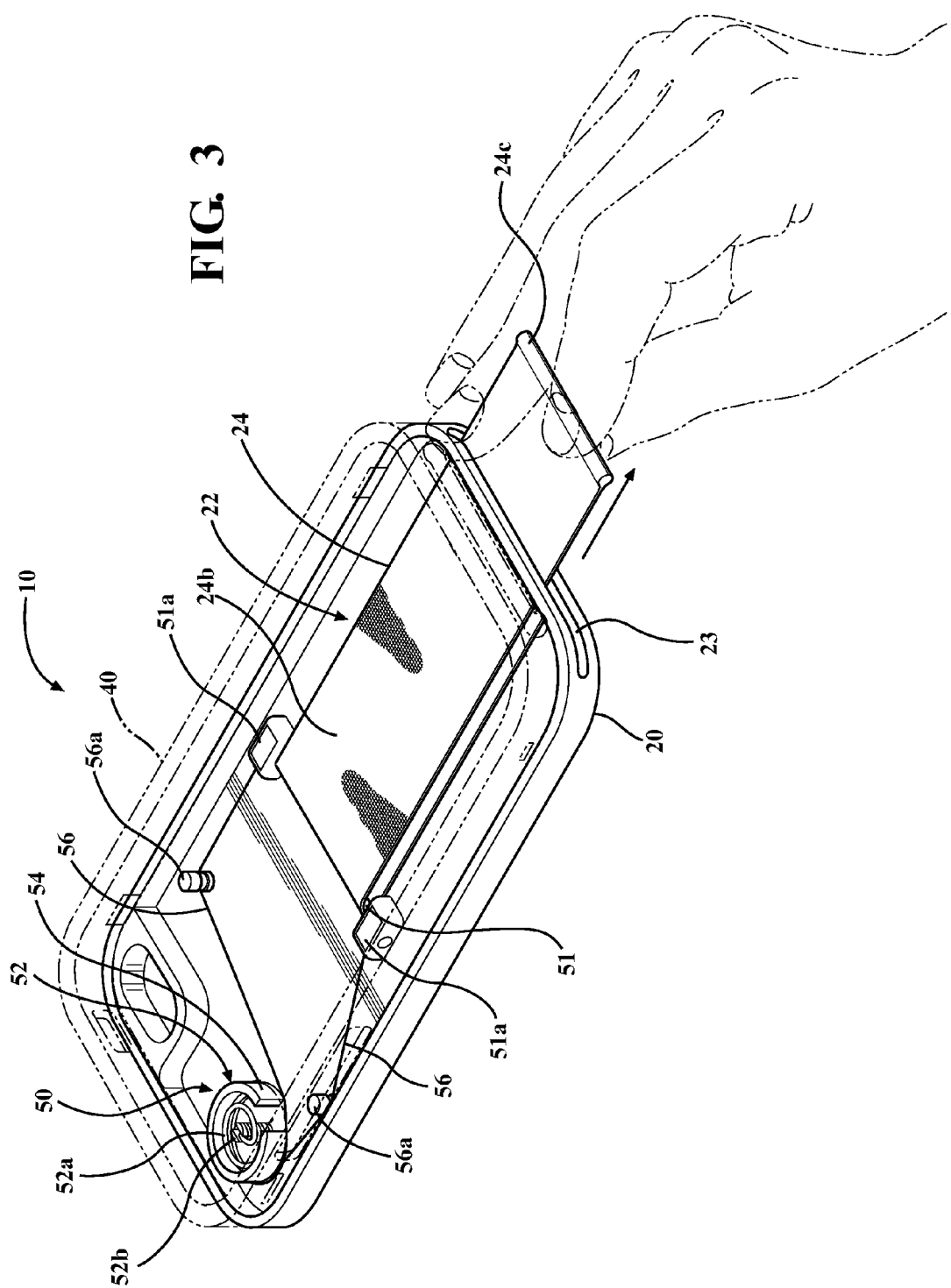
FIG. 3 is a perspective view of the case of FIG. 2 from the opposite end of the case, with the screen wipe partly extended from the side of the case.
Figure 4:
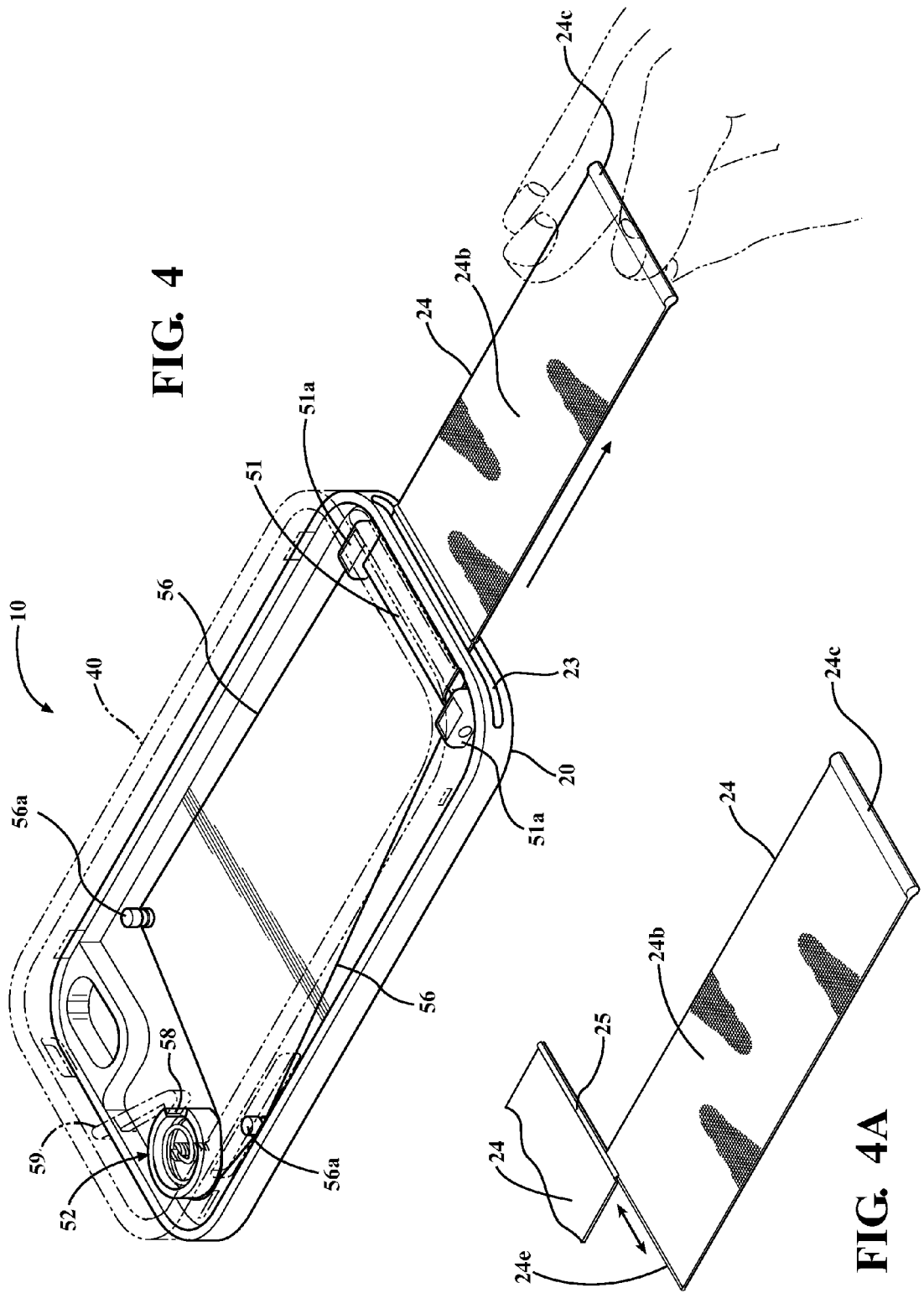
Figure 5:
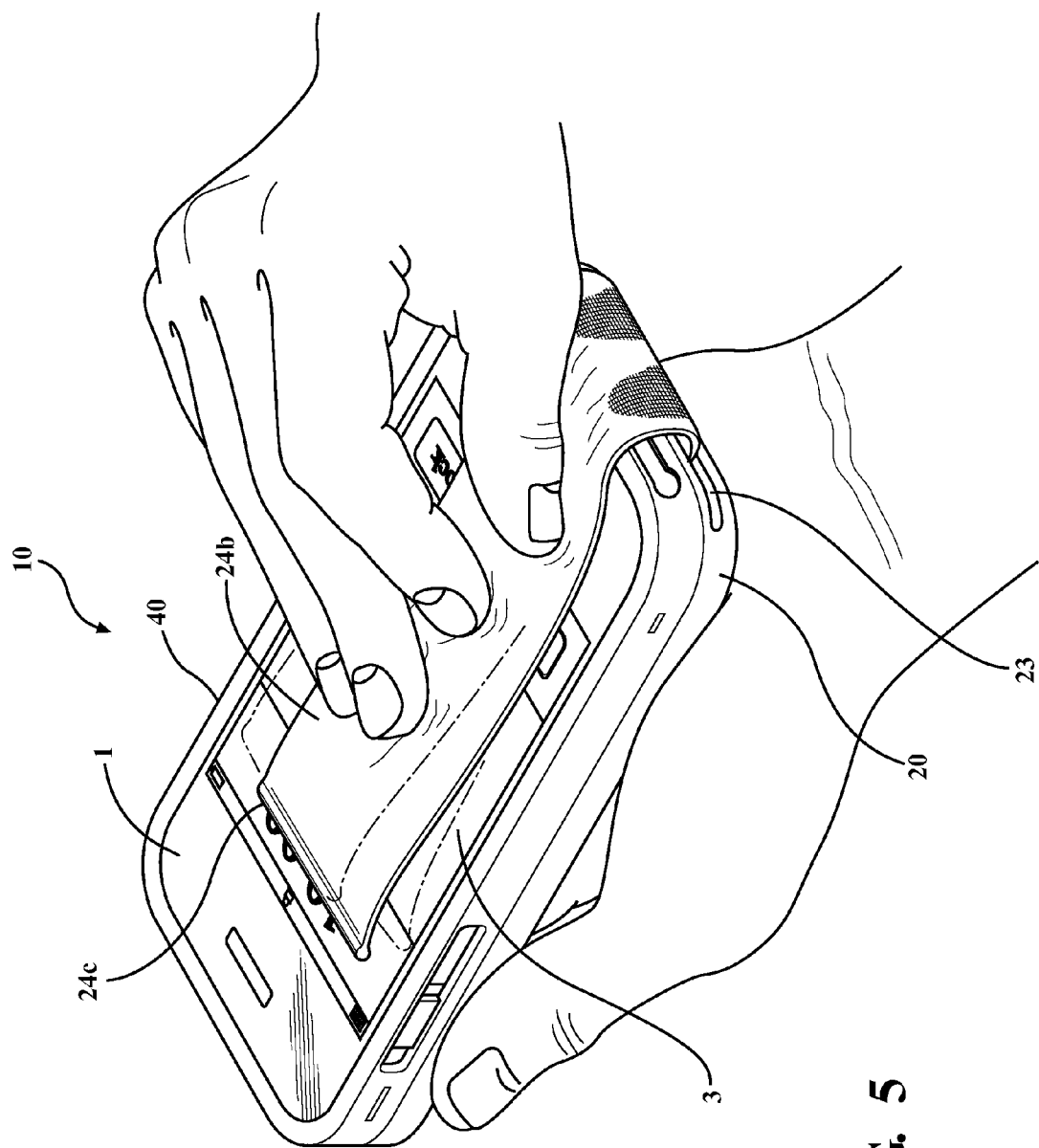
FIG. 5 is similar to FIG. 3, but shows an electronic screen device mounted to the case, and the wipe extended up and around to clean the screen.

Referring generally now to FIGS. 1-5, wipe 24 has an inner end 24a secured to the lower housing 20 and/or to the retracting means 50. In the currently preferred, illustrated example, inner end 24a is secured mechanically or adhesively to the inner surface 22b of wipe compartment 22 at one end adjacent a wipe access slot 23, with an intermediate portion of the wipe 24b operatively connected to retracting means 50. More specifically, intermediate portion 24b of wipe 24 is wrapped around a movable tension bar 51 mounted to slide on inner surface 22b of the wipe compartment toward and away from slot 23. The outer end 24c of the wipe is secured at slot 23 in a manner that makes it accessible to a user from outside housing 20, in the illustrated example with an integrated stop bar 24d having a width or diameter greater than the width of slot 23 to prevent the outer end of the wipe from being retracted into compartment 22. FIGS. 4 and 4A also illustrate an optional connecting structure for replaceably attaching at least a portion of wipe 24 to the housing and retraction mechanism, in the form of a rigid sleeve 25 secured to an outer edge of an inner portion of wipe 24 attached to the housing, and a rod 24e secured to an inner end of an outer, replaceable portion of wipe 24, the rod configured to slide into and mate with sleeve 25. Sleeve 25 is sized to slide around tension bar 51 and to pass through slot 23 when the wipe is extended from the housing. When the outer portion of wipe 24 is worn, it can be replaced by extending the wipe until sleeve 25 is outside the case, sliding rod 24e out of the sleeve, and connecting a new outer wipe portion its own rod 24e to sleeve 25. The rod and sleeve structure of FIGS. 4 and 4A represent but one possible way to provide a replaceable wipe; other possible means include, but are not limited to, hook-and-loop connections, different mechanical fasteners, and adhesives. It is also optionally possible to disassemble housing 20 for access to compartment 22, and to replace the entire wipe 24.

Figure 8:
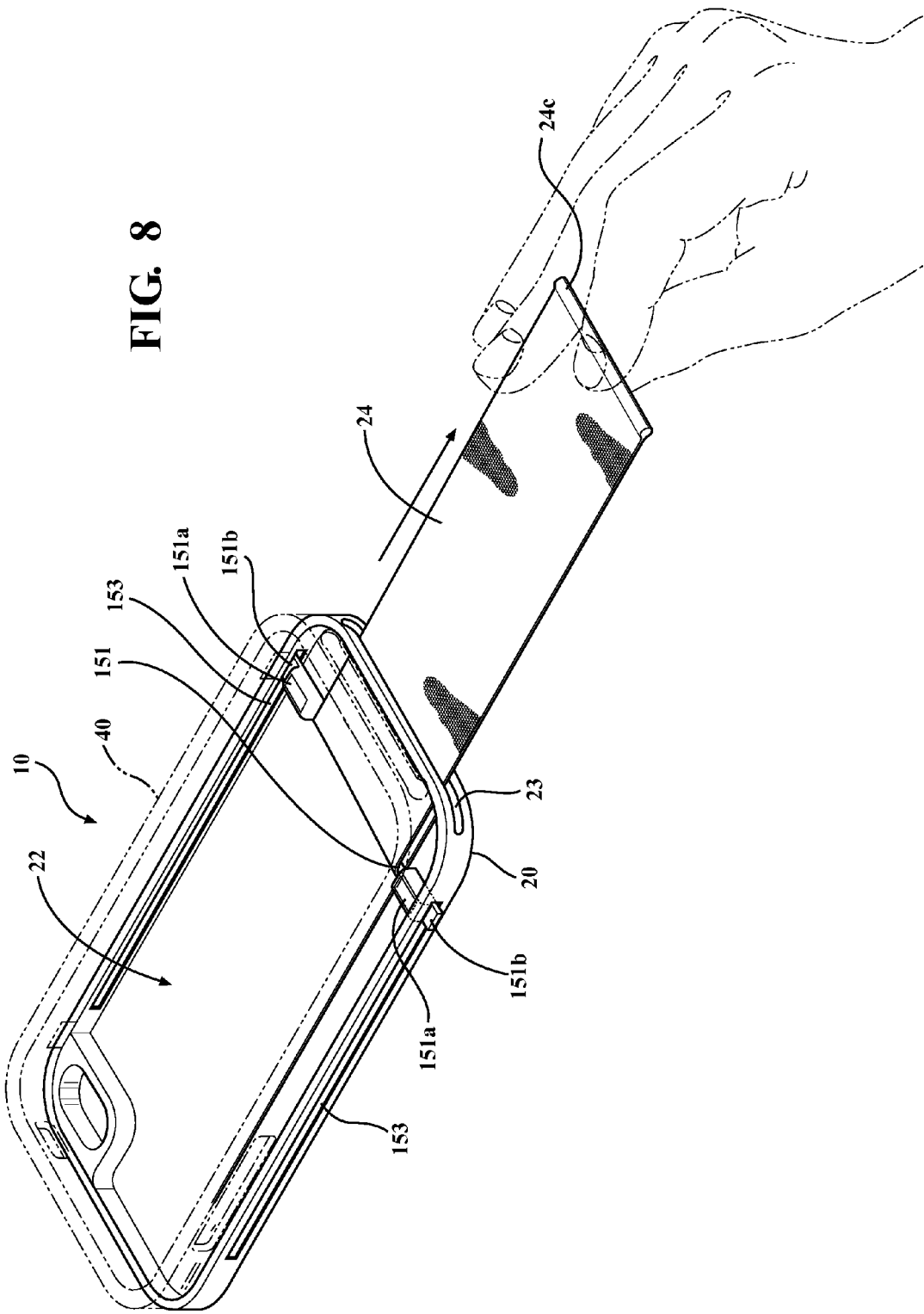
FIG. 8 is similar to FIG. 7, but shows the wipe partway extended from its compartment in the case.
Figure 9:
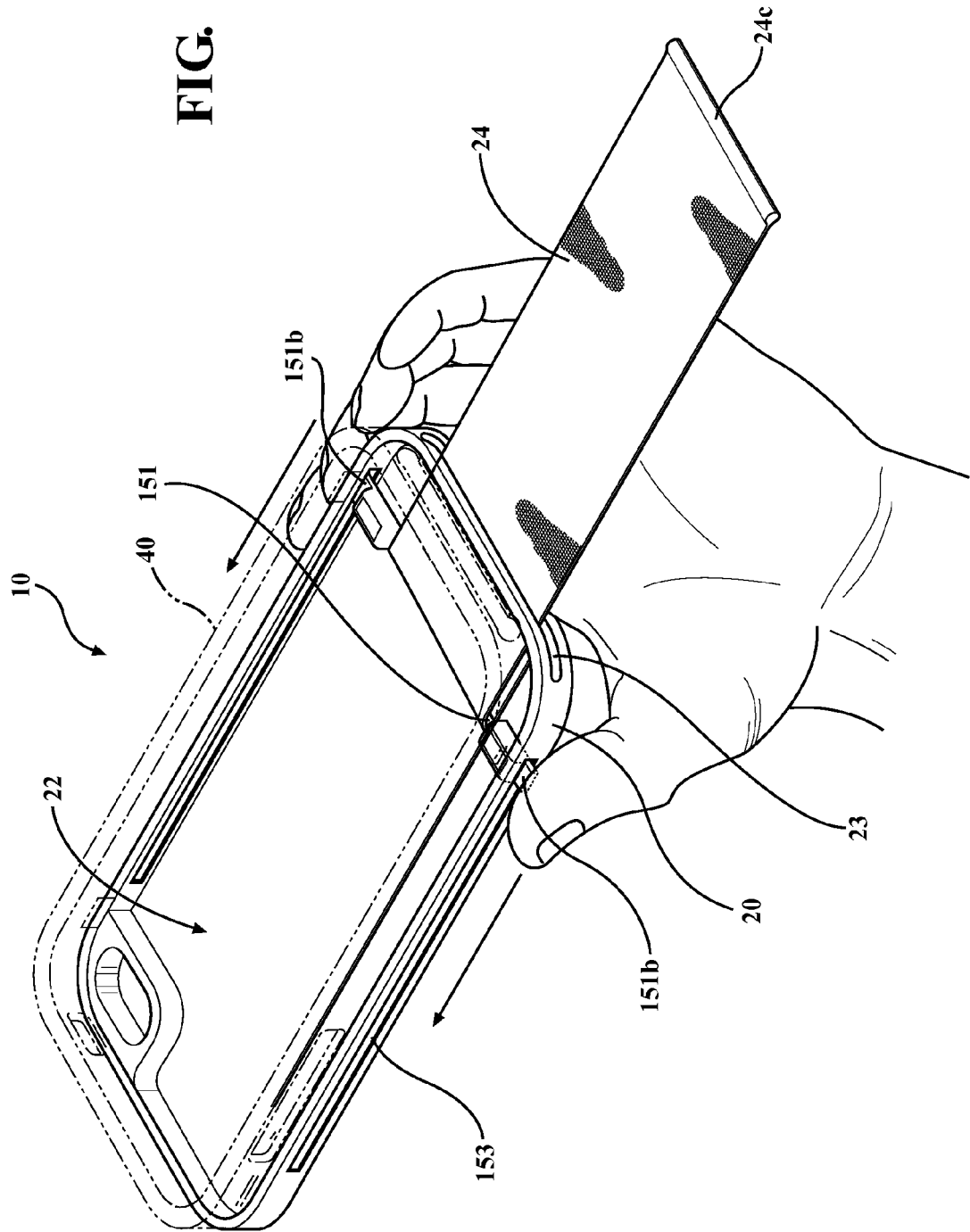
FIGS. 9 and 10 are similar to FIG. 8, but show the wipe being retracted into the case with the manual retraction mechanism.

Retracting means 50 may take different forms, and the retraction force may be provided by spring-tension, as shown in the example of FIGS. 1-6; may be provided by the user manually, as shown in the example of FIGS. 7-9; or may be motorized, for example by replacing the mechanical spring mechanism of FIGS. 1-6 with a small battery-powered motor, or by operatively connecting such a motor to the manual mechanism of FIGS. 7-9. It will also be understood that the particular retracting means examples of FIGS. 1-6 and FIGS. 7-9 are currently preferred embodiments, but are examples only and are not intended to limit the invention to a specific mechanism. Elastic retracting means are also possible.

In FIGS. 1-6, the spring-tensioned retracting means 50 is designed to automatically retract wipe 22 back into housing 20. Illustrated retracting means 50 includes a spring reel mechanism 52 comprising a coiled torsion spring 52a wound around and secured to a post 52b at an inner end, and contained within a rotatable reel 54. The outer end of spring 52a is connected to an operating cord 56 wound on the exterior of reel 54. The ends of cord 56 are directed around fixed guide posts 56a and connected to the ends 51a of tension bar 51.

Reel mechanism 52 normally tensions wipe 24 to the retracted position of FIG. 2, with only the stop-restricted outer end of the wipe outside the housing. In FIGS. 3 and 4, a user is shown retrieving the wipe 24 by grasping the outer end of the wipe via stop bar 24d, and pulling it manually out of the compartment through slot 23 against the tension of reel 52, unwinding cord 56 in the process as tension bar 51 is pulled toward the slot end of the housing 20. FIG. 3 shows the wipe partially extended from the housing, and FIG. 4 shows the wipe fully extended, with tension bar 51 against the slot end of the housing in compartment 22.

FIG. 5 shows a user wrapping the extended wipe 24 up and around the case, to a cleaning position over the screen 4 of a device 1 mounted to case 10 above the wipe compartment. As shown in the drawing, wipe 24 preferably has an extended length sufficient to reach the entirety of screen 4—the doubling of wipe 24 around movable bar 51 in the wipe compartment effectively doubles the effective length of the wipe capable of being stored in flat configuration in the compartment. Wipe 24 also preferably has a width approximating the width of screen 4.

As noted above, wipe 24 is preferably a relatively wide, flat sheet, and is preferably stored in a flat, sheet-like configuration in compartment 22, so that it feeds smoothly and flatly through slot 23. At a minimum, wipe 24 should be in a flat configuration adjacent slot 23.

While a movable tension bar with a wipe doubled around it is currently the preferred arrangement, it would also be possible to scroll wipe 24 around a horizontal spring-tensioned roller bar, much like a roller-style window shade. This arrangement would eliminate the need for a sliding tension bar and separate reel mechanism and operating cord, and would fit in a smaller-area compartment in housing 20. In FIG. 4, tension bar 51 at the bottom of the wipe compartment adjacent slot 23 may be considered to schematically represent such a roller-shade style retraction mechanism.

FIG. 6 illustrates an alternate extension and retraction orientation for wipe 24, through a slot 123 in a longitudinal side wall 20b of housing 20. The function and structure of the wipe 24, retraction mechanism 50, and tension bar 51 remain the same, although their dimensions and orientation have been altered to accommodate the different longitudinal dimensions of the case. It will be understood that wipe 24 and the retraction mechanism may be configured to accommodate differently-shaped housings for deployment of the wipe from any side. It may even be possible to form the wipe access slot in a peripheral edge of the bottom of housing 20, near one of the sides, to achieve a similar result.

Retraction mechanism 50 could include a small battery-powered motor instead of a spring reel such as 52, operable for example with an exterior switch on housing 20 to retract wipe 24 into the compartment 22 (and optionally extend it from the compartment). For this purpose, reel 52 can be considered to also schematically represent such a motor mechanism. Retraction mechanism 50 could also include one or more elastic members tensioned by the withdrawal of wipe 24 from compartment 22; such elastic retraction means can be considered to be schematically represented by cord 56 in FIGS. 1-6, and could include linear spring members stretched into tension as the wipe is extended from the case. Retraction mechanism 50 may also include a latch mechanism to hold wipe 24 in the extended position until retraction is desired; for example, as illustrated schematically in FIG. 4, a latch or pawl type operator 59 may be provided in housing 20 to automatically engage a notch or detent in reel 52 when the wipe is fully extended, and manually disengaged when the cleaning operation is complete, for example with a finger-operated release or an over-center type release activated by an extra pull on the fully extended wipe.

Figure 10:
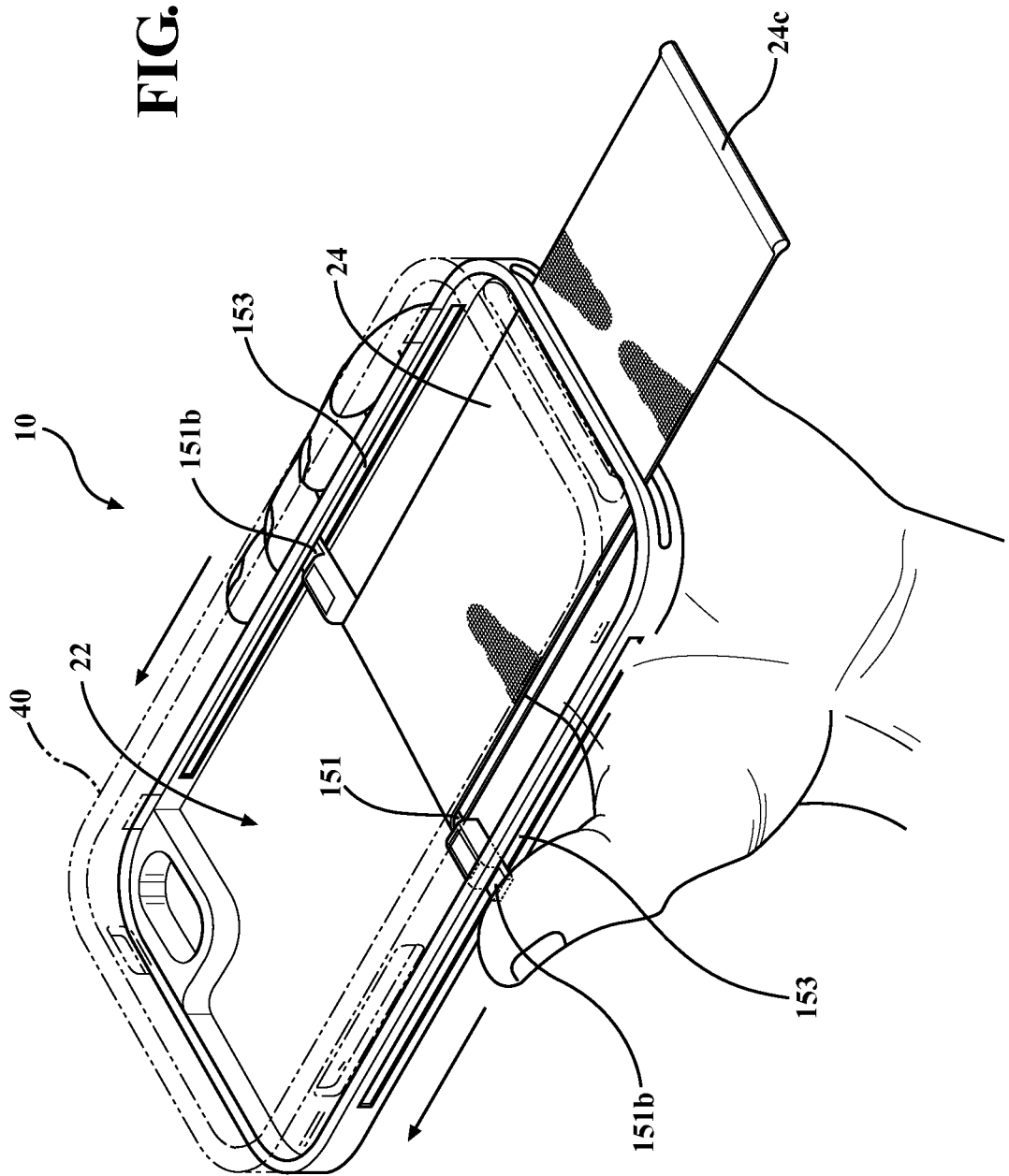

In the illustrated examples of FIGS. 1-6 above, retraction means 50 is operable to automatically retract wipe 24 back into compartment 22 through slot 23 when the wipe is released by the user, under spring tension from reel 52, which is progressively tensioned as the wipe is pulled from the compartment. FIGS. 7-10 illustrate an alternate, manual retraction mechanism, in which a manual slider bar 151 is mounted to slide freely in the directions of wipe withdrawal/retraction in compartment 22. Manual slider bar 151 includes ends 151a configured to slide in tracks 153 in opposing side walls 20b of housing 20, allowing wipe 24 to be pulled freely from compartment 22 through slot 23. The manner of securing wipe 24 in compartment 22, and of doubling the wipe around the slider bar, is the same as in FIGS. 1-6. However, no separate, automatic retraction means such as reel 52 is provided. Instead, slider bar ends 151a have extensions 151b extending through the sidewalls of the housing 20 beyond tracks 153, manually accessible to a user. By grasping exposed slider bar ends 151b as shown in FIGS. 9 and 10, the extended wipe 24 may be retracted smoothly back into compartment 22.

Another manual retraction option may be to operate a slider bar such as 151 with a manual reel mechanism, similar to reel-and-cord mechanism 50, 52, 56 in FIGS. 1-6, but with a manual reel operating handle accessible from outside the housing to manually wind the wipe back into the compartment.

DESCRIPTION OF OPERATION

In operation, the inventive case 10 is used by securing it to the lower or back face of a device 1, opposite the device's upper face 3 and screen 4. Whenever it is desired to clean the upper face 3 of device 1, and especially screen 4, wipe 24 is pulled out of its storage compartment beneath the device through slot 23 in the case, and further pulled up and around the case and the side of the device to clean the screen. Depending on the retraction mechanism in the case 10, wipe 24 is either automatically, manually, or with a switch activation (in case of a motor) retracted back into its storage compartment in the case under the device (or under the screen if the screen device and cleaning case are integrated upon manufacture of the device).

It will be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention should accordingly be construed by what the above disclosure teaches and suggests to those skilled in the art, and by any claims that the above disclosure supports in this application or in any other application claiming priority to this application.

What is claimed is:

1. A cleaning case for an electronic device with a display screen, the case comprising:
    a housing comprising an upwardly-facing, open screen face at an upper side of the case for displaying and providing access to a screen of an electronic device;
    a screen wipe storage compartment in the housing below the screen face, and a substantially flat, sheet-like, reusable screen wipe stored in the wipe storage compartment;
    a wipe-retracting means in the housing in operative communication with the wipe storage compartment; wherein,
    an inner end of the screen wipe is secured to the housing in a fixed position in the wipe storage compartment, and an intermediate portion of the screen wipe is operatively and movably connected to the wipe-retracting means in the wipe storage compartment, and an outer free end of the screen wipe is positioned at a wipe access slot opening onto a side of the case in communication with the wipe storage compartment, the wipe access slot having a width equal to or greater than a width of the screen wipe, the outer free end of the wipe being held in a substantially flat sheet-like configuration at the wipe access slot opening across substantially the width of the wipe access slot and manually accessible from outside the case; and wherein,
    the screen wipe has a length along an extension-retraction axis thereof sufficient for at least some of the intermediate portion of the screen wipe to be pulled out of the wipe compartment from the side of the case through the wipe access slot in the substantially flat sheet-like configuration by the outer free end to an extended cleaning position over substantially the entirety of the screen face.

2. The cleaning case of claim 1, wherein in the retracted position, the screen wipe is stored in a substantially sheet-like configuration in the wipe compartment.

3. The cleaning case of claim 2, wherein an inner portion of the screen wipe is stored in a rolled sheet-like configuration in the wipe compartment, and an outer portion of the screen wipe is stored in a flat sheet-like configuration in the wipe compartment.

4. The cleaning case of claim 1, wherein the outer free end of the screen wipe is positioned outside the wipe compartment in the retracted position, and includes stop means for preventing the outer free end from being retracted into the wipe compartment.

5. The cleaning case of claim 4, wherein the stop means comprises a substantially rigid rod member secured to the outer free end of the screen wipe and having a diameter or length greater than a height or length, respectively, of the wipe access slot.

6. The cleaning case of claim 1, wherein the screen wipe has a width substantially corresponding to a width of the screen face.

7. The cleaning case of claim 1, wherein the retracting means comprises means tensioned by the withdrawal of the screen wipe from the wipe compartment to automatically retract the wipe back into the compartment when the wipe is released.

8. The cleaning case of claim 7, wherein the retracting means comprises a spring member.

9. The cleaning case of claim 1, wherein the retracting means comprises an elastic member.

10. The cleaning case of claim 9, wherein the retracting means includes a latch mechanism.

11. The cleaning case of claim 1, wherein the housing comprises a device-mounting face at an upper side of the case associated with the screen face for mounting a separate electronic device with a screen in operative association with the screen face, the device-mounting face including means for securing a device to the housing.

12. The cleaning case of claim 11, wherein the means for securing a device to the housing comprises means for securing the housing to a lower face of a device.

13. The cleaning case of claim 12, wherein the means for securing the housing to a lower face of the device comprises a frame configured to fit over and surround a peripheral portion of the device and to be secured to the housing.

14. The cleaning case of claim 12, wherein the means for securing the housing to a lower face of the device comprises one or more locking members on the housing adapted to receive a peripheral portion of the device.

15. The cleaning case of claim 11, wherein the device-mounting face comprises a mounting face covering the wipe storage compartment.

16. The cleaning case of claim 1, wherein an outer portion of the wipe including the outer end of the wipe and at least some of the intermediate portion of the wipe is removably connected to an inner portion of the wipe comprising at least the inner end of the wipe such that the outer portion of the wipe can be replaced without replacing the inner portion of the wipe.

17. The cleaning case of claim 1, wherein the retracting means comprises a motor.

18. The cleaning case of claim 1, wherein the retracting means comprises manual means operable from outside the housing to manually retract the wipe back into the compartment.

19. In combination with an electronic device comprising a lower face and an upper face with a display screen, a cleaning case comprising:
a housing comprising an upwardly-facing, open screen face at an upper side of the case for displaying and providing access to the screen of the electronic device;
a screen wipe storage compartment in the housing below the screen face, and a substantially flat, sheet-like, reusable screen wipe stored in the wipe storage compartment;
a wipe-retracting means in the housing in operative communication with the wipe storage compartment; wherein,
an inner end of the screen wipe is secured to the housing in a fixed position in the wipe storage compartment, and an intermediate portion of the screen wipe is operatively and movably connected to the wipe-retracting means in the wipe storage compartment, and an outer free end of the screen wipe is positioned at a wipe access slot opening onto a side of the case in communication with the wipe storage compartment, the wipe access slot having a width equal to or greater than a width of the screen wipe, the outer free end of the wipe being held in a substantially flat sheet-like configuration at the wipe access slot opening across substantially the width of the wipe access slot and manually accessible from outside the case; and wherein,
the screen wipe has a length along an extension-retraction axis thereof sufficient for at least some of the intermediate portion of the screen wipe to be pulled out of the wipe compartment from the side of the case through the wipe access slot in the substantially flat sheet-like configuration by the outer free end to an extended cleaning position over substantially the entirety of the screen at the screen face.

20. A retractable cleaning cloth for an electronic device, contained within a protective device case, further comprising:
a substantially flat, sheet-like, reusable fabric wipe;
a protective case of an electronic device including within its interior a cavity, the cavity including a wipe access slot opening on a side of the case, the wipe access slot opening having a width equal to or greater than a width of the screen wipe;
a retracting means within the cavity operatively connected to a first end of the fabric wipe, the fabric wipe extending from the retracting means through the wipe access slot opening in the case to a second end held in a substantially flat sheet-like configuration at the wipe access slot opening across substantially the width of the wipe access slot opening;
stop means attached to the second end of the wipe sufficient to prevent the second end of the wipe from being retracted into the case through the wipe access slot opening; and,
an intermediate portion of the wipe being retractably removable from the case through the wipe access slot opening in the substantially flat sheet-like configuration to a distance sufficient to allow the extracted portion of the wipe to be applied to the viewing face of an electronic device contained in the case for cleaning purposes.

21. The retractable cleaning cloth apparatus of claim 20, wherein the case is integral with the device.

22. The retractable cleaning cloth apparatus of claim 20, wherein the case is formed separately from the device, and the device is removably contained in the case.

* * * * *